United States Patent
Klassen et al.

(10) Patent No.: US 6,752,881 B2
(45) Date of Patent: Jun. 22, 2004

(54) METALLIFEROUS STORAGE MATERIAL FOR HYDROGEN AND METHOD FOR PRODUCING SAME

(75) Inventors: Thomas Klassen, Hamburg (DE); Rüdiger Bormann, Hamburg (DE); Wolfgang Oelerich, Geesthacht (DE); Volker Güther, Burgthann (DE); Andreas Otto, Rosstal (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 89 days.

(21) Appl. No.: 09/962,859

(22) Filed: Sep. 25, 2001

(65) Prior Publication Data
US 2002/0061814 A1 May 23, 2002

Related U.S. Application Data

(63) Continuation-in-part of application No. PCT/EP99/02974, filed on Sep. 17, 1999.

(30) Foreign Application Priority Data

Mar. 26, 1999 (DE) .......................................... 199 15 142
Mar. 26, 1999 (DE) .......................................... 199 13 714

(51) Int. Cl.[7] .............................................. C22C 23/00
(52) U.S. Cl. ........................ 148/400; 148/276; 148/280; 148/284; 148/513; 148/514; 148/420; 420/405; 420/414
(58) Field of Search ................................ 148/276, 280, 148/284, 513, 514, 420; 420/405, 414

(56) References Cited

U.S. PATENT DOCUMENTS 5,616,432 A * 4/1997 Ovshinsky et al. ............ 429/59
5,864,072 A * 1/1999 Kobayashi et al. ............ 75/246

FOREIGN PATENT DOCUMENTS

EP 0184427 A * 6/1986 ............. C01B/3/56
JP 03281710 A * 12/1991 ............. B22F/9/20

* cited by examiner

Primary Examiner—Andrew L. Oltmans
(74) Attorney, Agent, or Firm—Klaus J. Bach

(57) ABSTRACT

In a metalliferous storage material for hydrogen a metal oxide is provided in or on the surface of the metalliferous material as a catalyst for the hydrogenation or dehydrogenation of the metalliferous storage material.

14 Claims, 10 Drawing Sheets

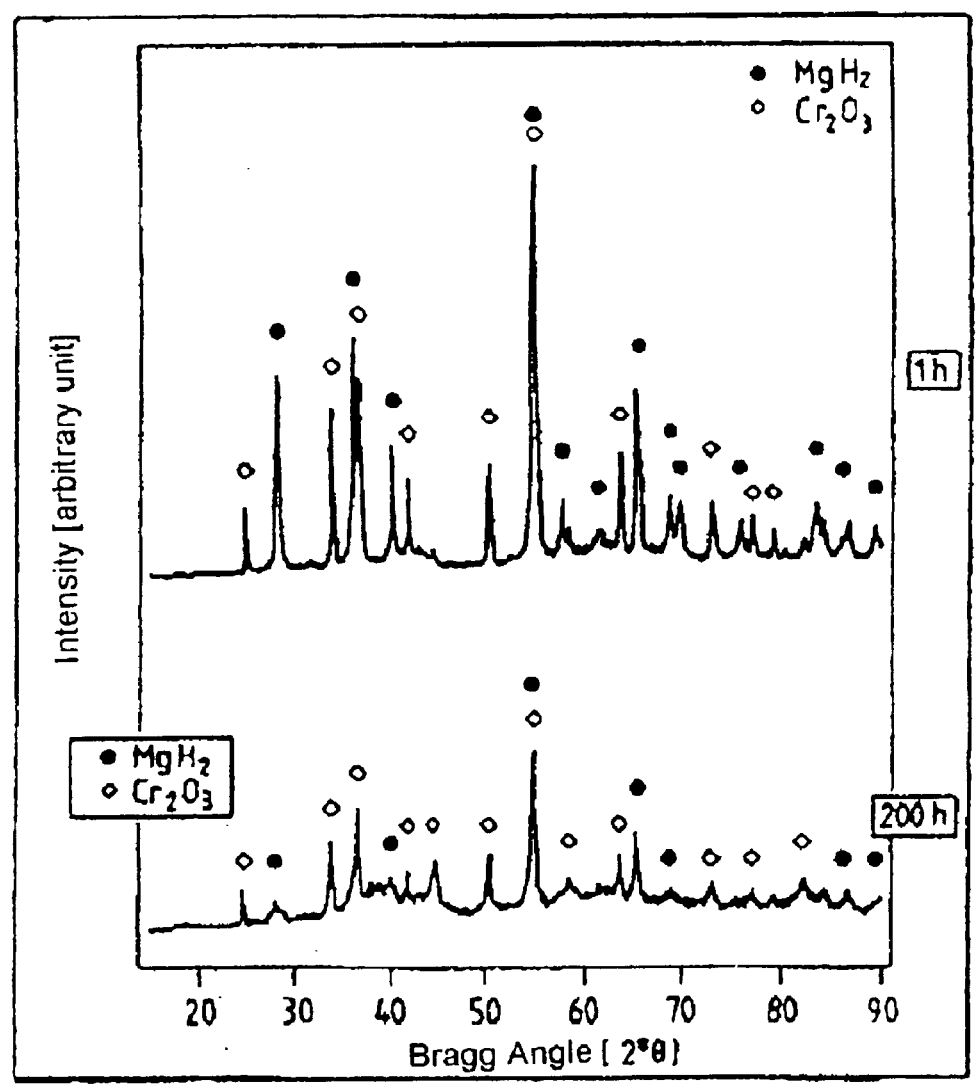

95 MgH$_2$ + 5 Cr$_2$O$_3$

95 MgH$_2$ · 5Cr$_2$O$_3$ $95 MgH_2 + 5 Cr_2O_3$

METALLIFEROUS STORAGE MATERIAL FOR HYDROGEN AND METHOD FOR PRODUCING SAME

This is a continuation-in-part application of international application PCT/EP99/02974 filed Sep. 17, 1999 and claiming the priority of German applications 199 13 714.5 and 199 15 142.3 both filed on Mar. 26, 1999.

BACKGROUND OF THE INVENTION

The invention relates to a metalliferous storage material and a method of producing the material. It is first pointed out that, under the term metalliferous material, atomic metals, metal alloys, intermetallic phases of metals or compound materials as well as corresponding hybrids are to be understood.

It is known that, on the basis of reversible metal hydrides, hydrogen storage devices, so-called hydride storage devices, can be formed. The storage device can be charged while heat is released, that is, hydrogen is bound by chemo-sorption and discharged by the application of heat. Hydrogen storage devices can therefore be excellent energy storage devices for mobile and/or stationary applications. They might form in the future a notable storage potential since no noxious emissions are released during the discharge of the hydrogen storage devices.

Very suitable for such hydride storage devices are the so-called nano-crystalline hydrides, which are capable of rapidly storing and releasing the hydrogen. Their manufacture however has been very expensive, so far. Their manufacture, so far, has involved high-energy grinding of elemental components or pre-alloys of nano-crystalline alloys, wherein the grinding procedure can be very long. In a final process step, these nano-crystalline alloys were subjected, depending on the conditions, to a multistage heat treatment under a high hydrogen pressure to be hydrogenated thereby. For many alloys, furthermore, a multiple charging and discharging with hydrogen is necessary to achieve full capacity.

Alternatively, it has been tried to synthesize the respective hydrides by grinding in a hydrogen atmosphere or in a pure chemical way. It has been found, however, that, in this way, the yield of the desired hydrides is smaller and partially additional undesirable phases occur.

Furthermore, certain phases could, or respectively can, not be formed with the known conventional methods.

The German patent application No. 197 58 384.6 discloses a method for the manufacture of nano-crystalline metal hydrides with which the manufacture of stable and meta-stable hydrides or hydride-meta-stable alloys is possible with a very high yield of up to 100%. The method described in the mentioned German patent application can be performed with easily controllable limiting conditions and with a relatively small energy consumption.

In order for such a hydrogen storage device to rapidly provide the energy stored therein when needed and to permit rapid charging of the hydrogen storage device, it is desirable that the reaction speed during hydrating and dehydrating of metals at low temperatures is kept very high that is a very high reaction speed is to be aimed at.

To this end, so for, the reaction surface has been increased by reducing the size of the particles/crystals of the materials to be hydrogenated or dehydrogenated as far as this was technically feasible. Other means for increasing the reaction speed included the addition of nickel, platinum or palladium.

The disadvantage of the measures known so far for increasing the reaction speed during the hydrogenation and particularly the dehydrogenation, that is, the delivery of the hydrogen from the hydrogen storage device is that the available speeds are in-sufficient for hydrogen storage devices intended for technical applications.

It is therefore the object of the present application to provide a metalliferous material, such as a metal, a metal alloy or an intermetallic phase, compound materials of metals as well as corresponding hydrides with which, during hydrogenation and dehydrogenation, the reaction speeds are so high, that they are technically feasible for use as energy storage devices. A method is to be provided by which the manufacture of a metalliferous material such as a metal, a metal alloy, an intermetallic phase or a compound material of the materials or corresponding hydrides can be performed in a simple and inexpensive way such that metals manufactured in this way can be used commercially as hydrogen storage devices in a cost-effective manner and with the technically necessary high reaction speed during hydrogenation and dehydrogenation.

SUMMARY OF THE INVENTION

In a metalliferous storage material for hydrogen a metal oxide is provided in or on the surface of the metalliferous material as a catalyst for the hydrogenation or dehydrogenation of the metalliferous storage material.

In accordance with the invention, the fact is utilized that, in comparison with pure metals, metal oxides are brittle, whereby a smaller particle size and a homogeneous distribution of the metal oxide in the material is achieved. As a result, the reaction kinetics are substantially increased in comparison with metallic catalysts. Another advantage is that the metal oxides are available as catalysts generally at much lower prices than metals or respectively, metal alloys so that also the aim of commercial utilization at reasonable costs for the metalliferous materials according to the invention can be achieved.

Basically, the metal oxide is an oxide of atomic metals such as the oxide of the metals Mg, Al, Si, Ca, Sc, Ti, V, Cr, Mn, Fe, Co, Ni, Cu, Zn, Y, Zr, Nb, Ce, Mo, Sn, La, Hf, Ta, W. In accordance with an advantageous embodiment of the invention, the metal oxide may also consist of mixed oxides of the metals, particularly of the metals listed earlier or of mixtures of the metal oxides.

Advantageously, the metal oxide or metal oxides may be formed by rare earth metals or metal oxides or mixtures of rare earth metals.

In an advantageous embodiment of the invention, the metal has a nano-crystalline structure, wherein, equally advantageously, also the catalyst has a nano-crystalline structure. If the metal and/or the catalyst have a crystalline structure, the reaction surface and, consequently, the reaction speed of the hydrogenation or, respectively, the dehydrogenation of the metalliferous material are increased.

The method according to the invention for the manufacture of such a metalliferous material is characterized in that the metalliferous material and/or the catalyst are subjected to a mechanical grinding procedure with the object to form, from both components, a powder with an optimized reaction surface of the metalliferous material as well as a uniform distribution of the catalyst.

The grinding procedure itself may be selected, depending on the metalliferous material and/or the catalyst, to be differently long so as to achieve the optimal desired reaction surface and an optimal distribution of the catalyst of the metalliferous material according to the invention. In this connection, it may be advantageous if the metalliferous material as such is first subjected to the grinding and the catalyst is added subsequently to the grinding process, however the process may be reversed, that is, the catalyst may be first subjected to the grinding followed by the metalliferous material. Also, these distinguished possible procedures for the grinding are selected depending on the metalliferous materials and depending on the catalyst to be added.

In order to prevent reactions with the ambient gas during the grinding of the metaliferous material (metal, metal alloy, intermetallic phase, compound material as well as the hydrides thereof) the method is preferably performed under an inert atmosphere wherein the inert gas is preferably argon.

As already mentioned, the duration of the grinding process for a metalliferous material (metal, metal alloy, intermetallic phase, compound material as well as the hydrides thereof) and the catalyst is variably selectable depending on the metalliferous material and the selected catalyst. Preferably, the duration of the grinding process is in the area of 1 to 200 hours.

In another type of the method for the manufacture of a metalliferous material, which may be used as electrode material at least for secondary elements, at least one metal oxide is formed on the surface of the electrode material in situ by contact with oxygen from elements of the electrode/ material or by direct supply of oxygen. In this way, a catalyzing oxide can be formed in situ from elements of the hydride storage material.

Preferably, during performance of the method, the surface of the electrode material is activated chemically and/or mechanically before the oxide is formed, whereby the oxide formation of the metal can be improved.

The invention will now be described in detail with reference to various diagrams, which describe the hydrogenation and dehydrogenation behavior as well as other important parameters.

BRIEF DESCRIPTION OF THE DRAWINGS

FIG. 1 an x-ray diffraction diagram after a grinding duration of the metalliferous material of one hour and 200 hours, FIG. 2a a representation of the sorption behavior of the metalliferous material for the representation of the charging temperature and the charging speed with hydrogen;

DESCRIPTION OF PREFERRED EMBODIMENTS

The metalliferous material of the invention may comprise various metals, metal alloys, intermetallic phases, compound materials and corresponding hydrides. They form the storage material of the hydrogen storage devices according to the invention. To accelerate the hydrogenation or the dehydrogenation metal oxides are added as catalysts to these metalliforms materials, wherein the metal oxide may also be a mixed oxide, that is, it may include several metal oxides. Metal oxides, or, respectively, mixed oxides may consist for example of Mg, Al, Si, Ca, Sc, Ti, V, Cr, Mn, Fe, Co, Ni, Cu, Zn, Y, Zr, Nb, Mo, Sn, Ce, La, Hf, Ta, W or of rare earth. The above listing however is not to be understood in such a way that it represents a limitation of the metal oxides according to the invention to oxides of these metals. Oxides of metals may be for $Al_2O_3$, $SiO_2$, $TiO_2$, $V_2O_5$, $Cr_2O_3$, $Fe_2O_3$, $Fe_3O_4$, CuO, $Nb_2O_5$, MoO, $MoO_2$, etc. The catalyst may also have a nano-crystalline structure.

A method for the manufacture of a metalliferous material according to the invention will be described on the basis of an example. In the description reference is made to the figures.

Examples:

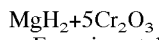

Experimental particulars: 30.7 g $MgH_2$ and 9.3 g $Cr_2O_3$ were placed into a 250 ml grinding container of steel. 400 g steel balls (ball diameter 10 mm, ratio powder: balls=1:10) were added. The powder was subjected to a mechanical high-energy grinding process in a planetary ball mill of the type "Fritsch Pulverisette 5". The grinding process was performed under an argon atmosphere for all together 200 hours. During and after the grinding process small amounts of powder were removed for an X-ray structure analysis. FIG. 1 shows the x-ray diffraction diagrams after a grinding duration of 1 hr and 200 hrs. In addition to the $MgH_2$ also the $Cr_2O_3$ is detectable after 200 hrs by x-ray structure analysis.

Figure 2A:
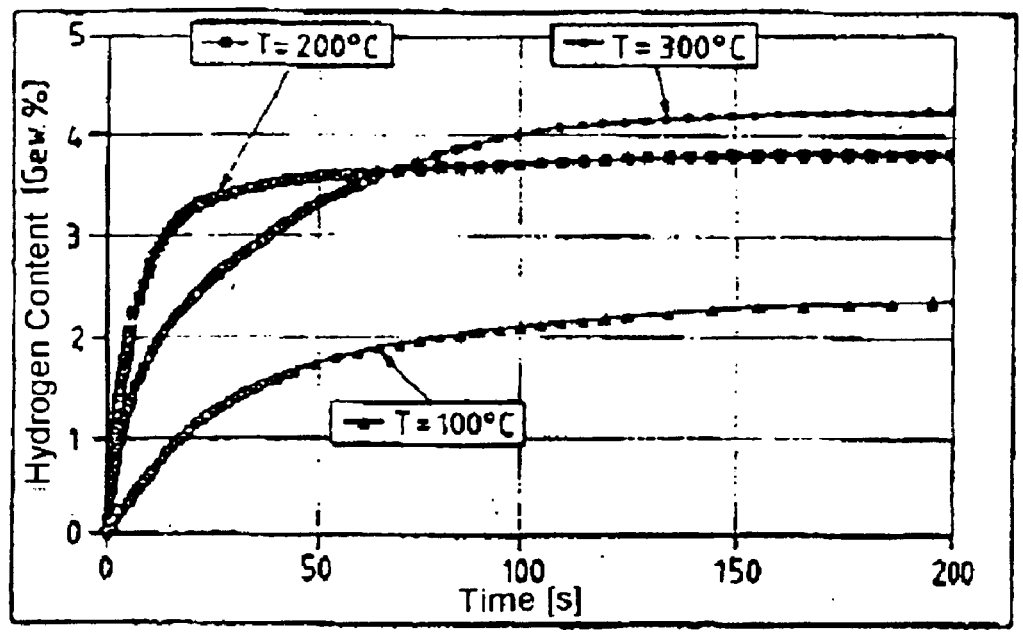
FIG. 2b the sorption behavior of the metalliferous material at another temperature depending on the charging time, FIG. 2c a pressure curve with magnesium-hydrogen for the representation of a maximal hydrogen content of the metalliferous material, FIG. 3 X-ray diffraction curves showing the catalyst $Cr_2O_3$ in the hydrogenated as well as in the dehydrogenated state and also traces of MgO and Cr, FIGS. 4a–4d a representation of the improvement of the kinetics during the absorption of hydrogen as well as its desorption, FIG. 5 a typical pattern for the charging capacity during the first 30 charge and discharge cycles of an untreated $AB_5$ hydride alloy, FIG. 6 the representation of an activation after the first 5 cycles to show an insufficient activation, FIG. 7 a pattern according to FIG. 5 catalyzed however with a metal oxide according to the invention, FIG. 8 a pattern according to FIG. 6 catalyzed however with a metal oxide according to the invention, FIG. 9 a pattern for the discharge capacity achievable with an untreated alloy in the 10. cycle as a function of the discharge currents applied (with respect to 1 g alloy), FIG. 10 a representation according to FIG. 9, but in the $30^{th}$ cycle, FIG. 11 a corresponding pattern for the same alloy as in FIG. 9, however, catalyzed with a metal oxide according to the invention, and FIG. 12 a corresponding pattern for the same alloy as in FIG. 10, but catalyzed with a metal oxide according to the invention.
Figure 2B:
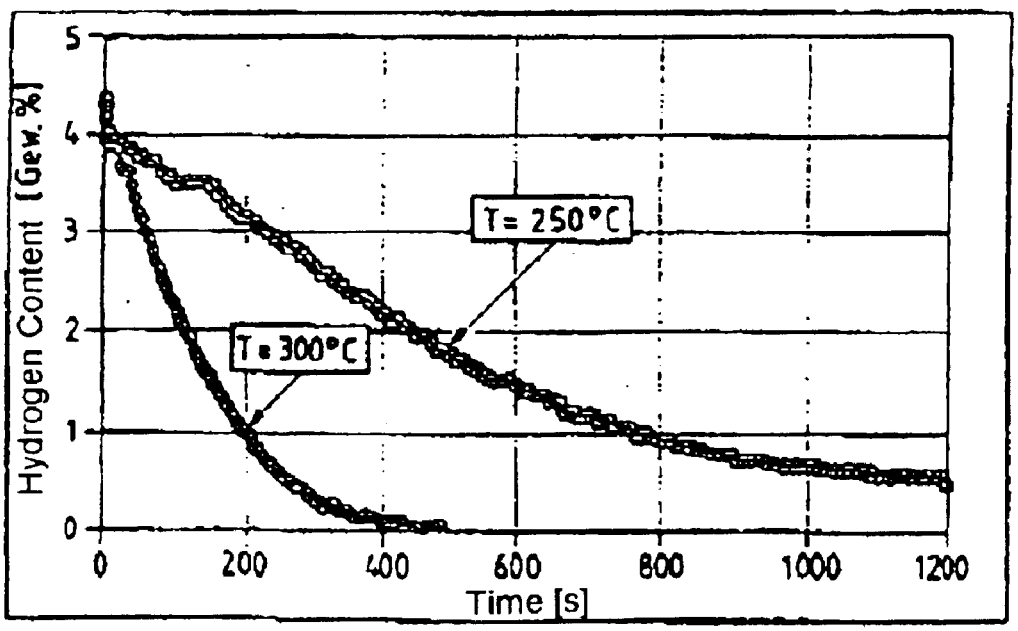
Figure 2C:
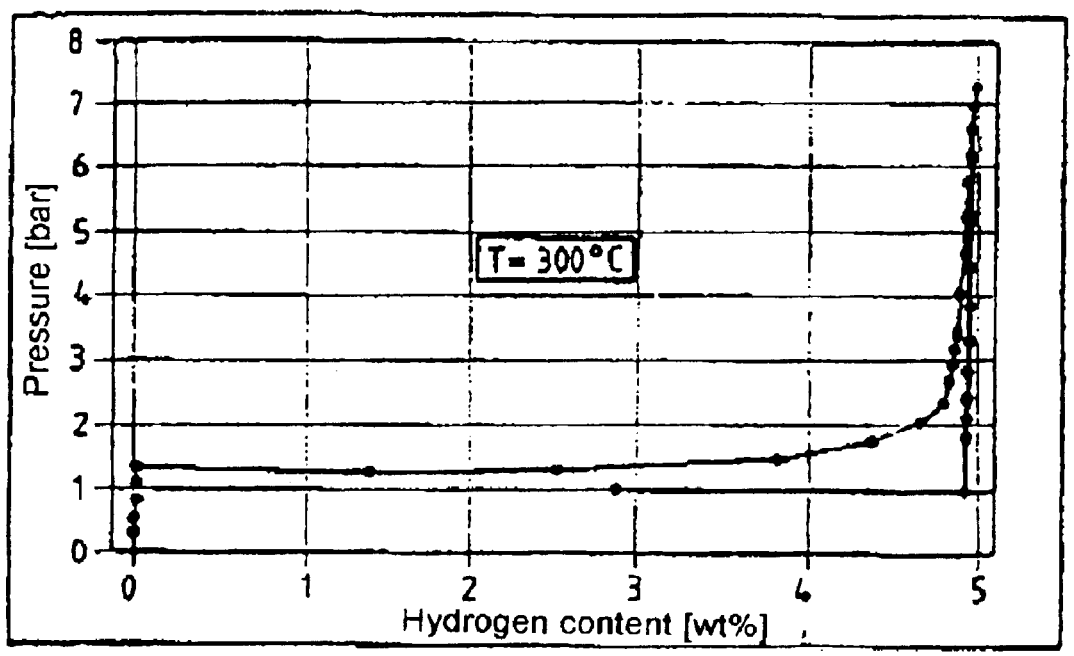
Figure 3:
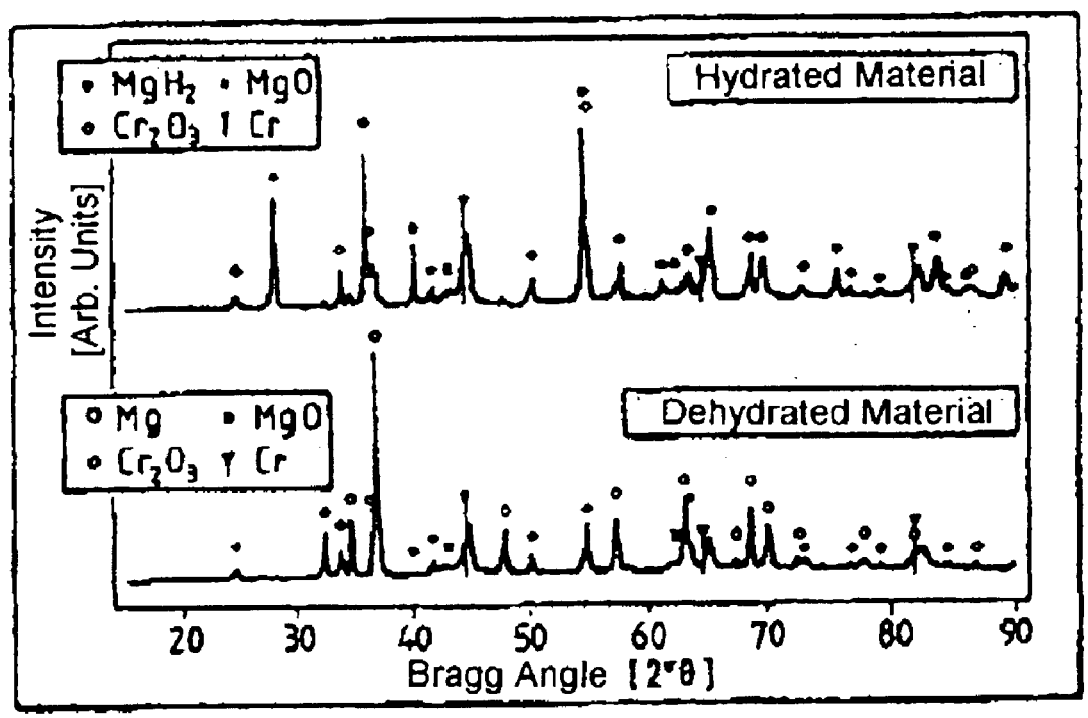

Sorption Behavior: In accordance with FIG. 1, the material can be charged at a temperature of 300° C. in 100 sec with 4 wt % hydrogen. At a temperature T=250° C., a hydrogen content of about 3.6 wt % is reached already after about 50 sec. Also, at T=100° C., a rapid charging is possible. A complete hydrogen discharge is possible at T=300° C. in about 400 sec. At T=250° C., however, in 1200 sec (see FIG. 2b). In the PCT diagram (FIG. 2c), a maximal hydrogen content of the material of 5 wt % is shown in addition to the pressure level of 1.6 bar, which can be assigned to the system magnesium-hydrogen. FIG. 3 shows x-ray diffraction pictures in which, in addition, to $Cr_2O_3$, traces of MgO and eventually Cr as inactive phase are shown in the hydrogenated as well as in the dehydrogenated state. Furthermore, $MgH_2$ can be found in the hydrogenated and Mg can be found in the dehydrogenated state.

Comparison of Magnesium+Chromium Oxide with Pure Magnesium

Figure 4A:
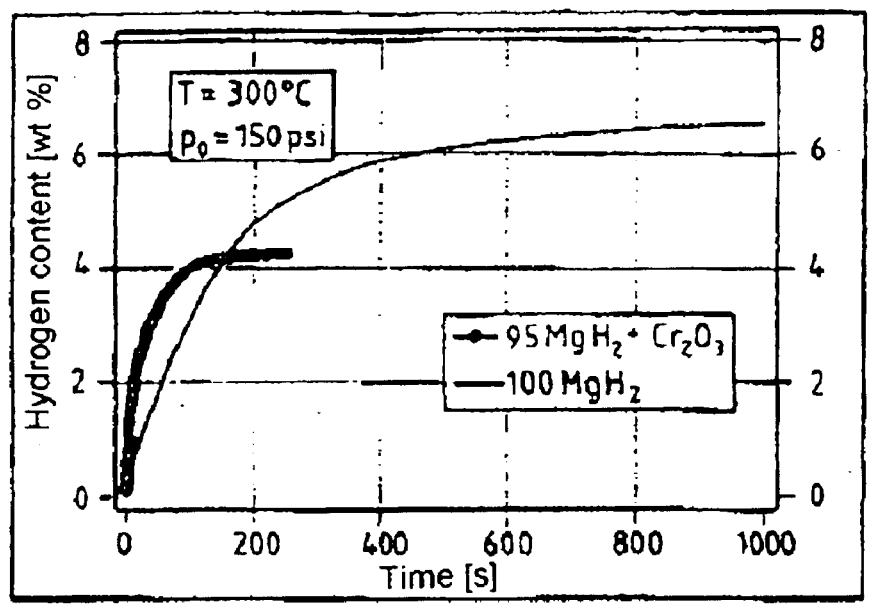
Figure 4B:
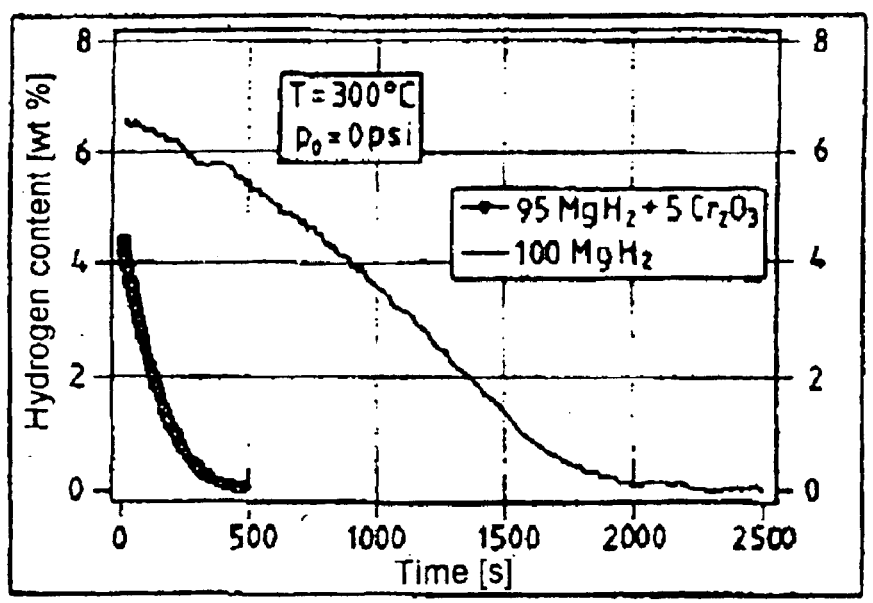
Figure 4C:
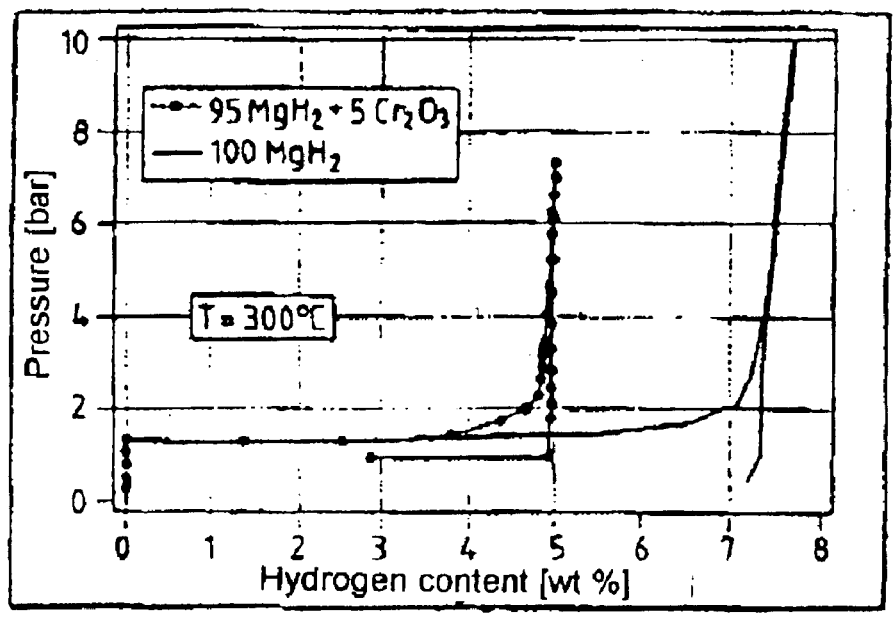
Figure 4D:
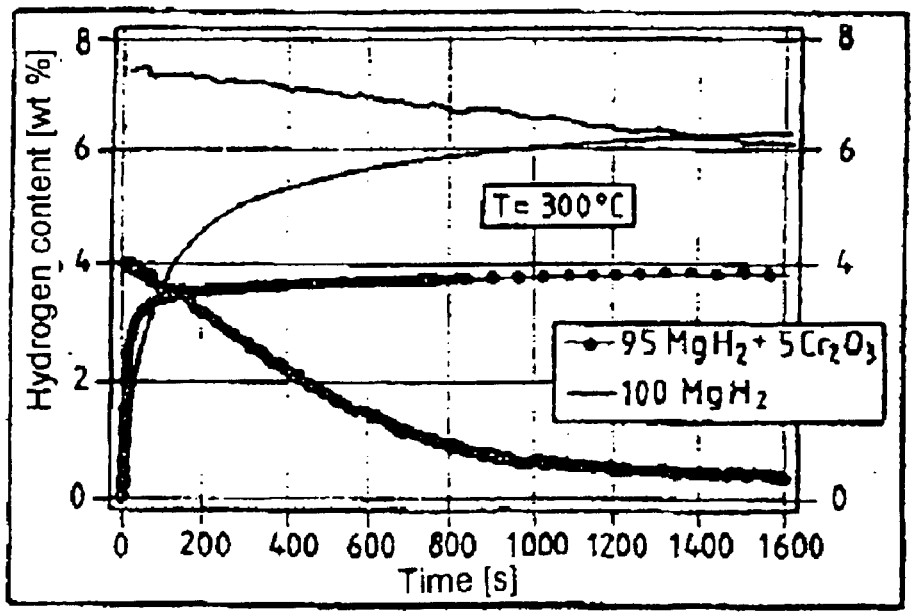
Figure 5:
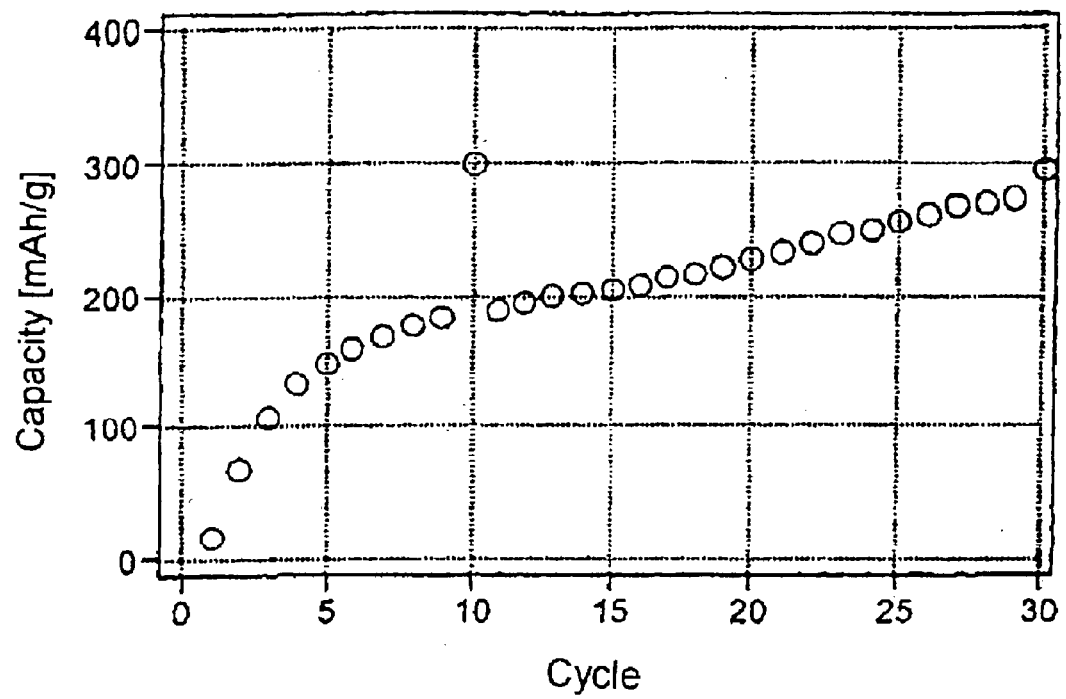
Figure 6:
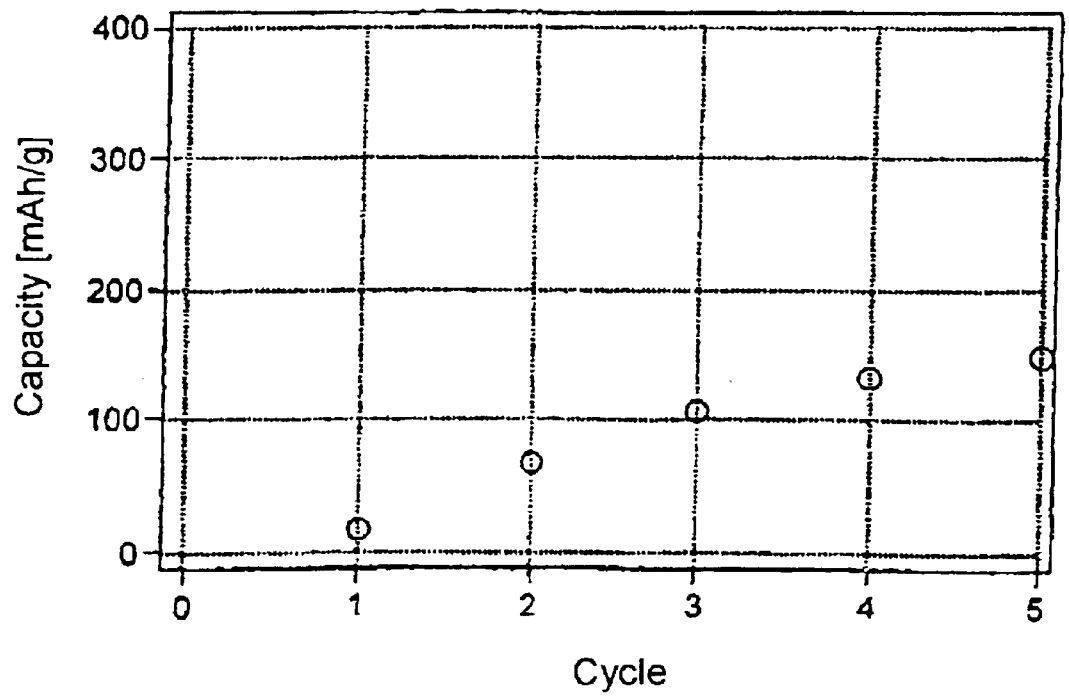
Figure 7:
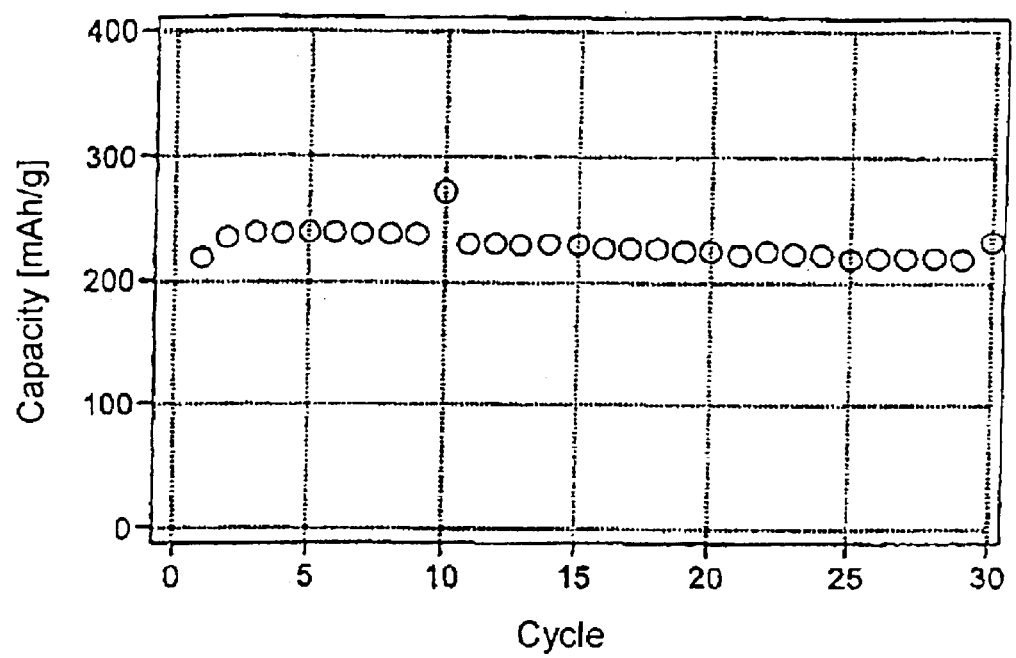
Figure 8:
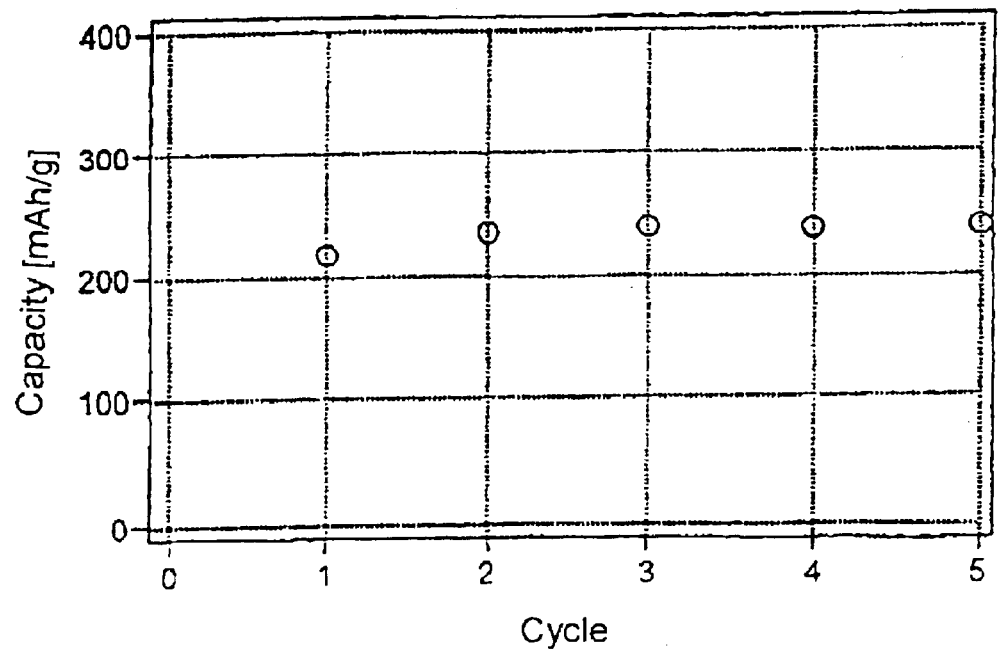
Figure 9:
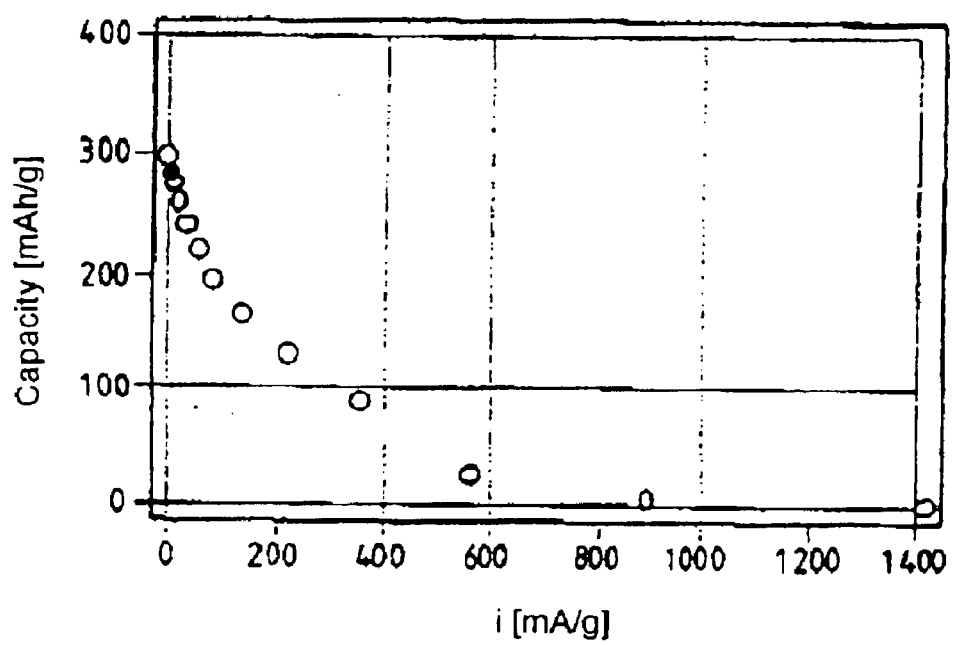
Figure 10:
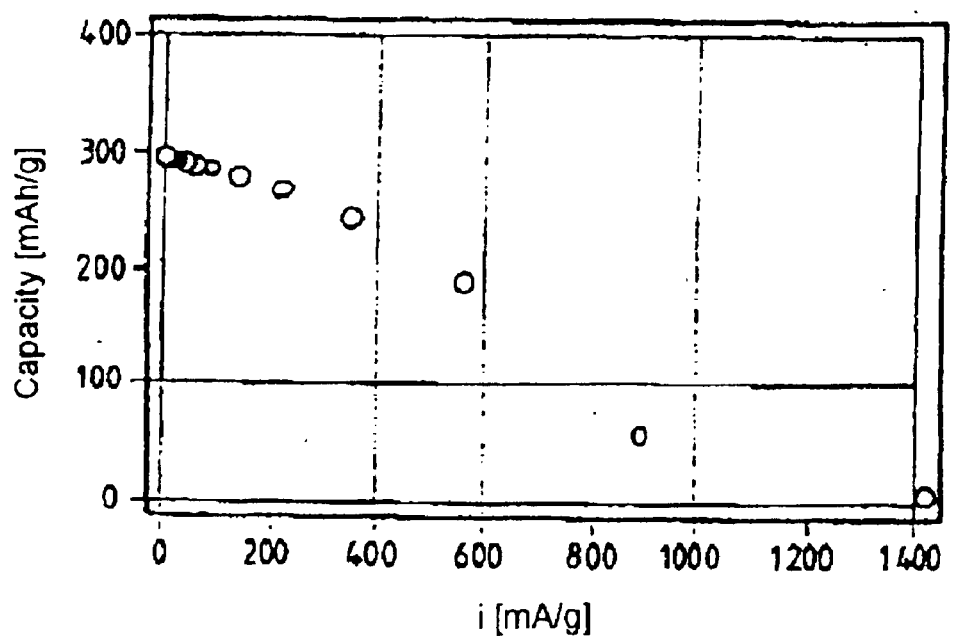
Figure 11:
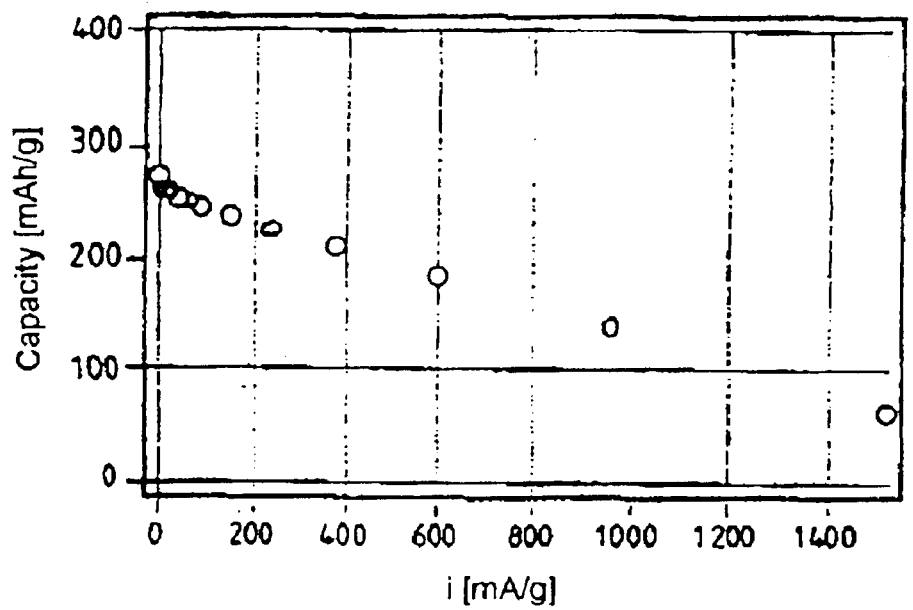
Figure 12:
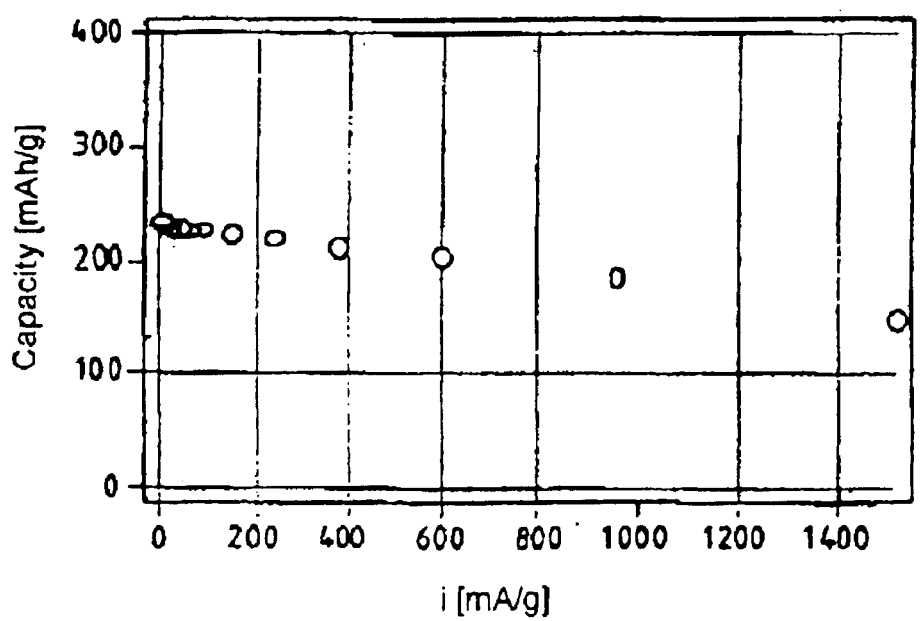

In accordance with FIGS. 4a–4d a clear improvement of the kinetics during absorption of hydrogen as well as during its desorption is apparent. The samples subjected to the same grinding process have different total capacities of hydrogen. 95 $MgH_2$+5 $Cr_2O_3$ can store 5 wt % and 100 $MgG_2$ can store 7.6 wt % hydrogen. This is shown in the PCT diagrams (FIG. 4c). FIG. 4a shows an increase of the absorption speed at T=300° C. by the factor 10. During desorption at the same temperature a speed advantage with a factor of 6 is achieved (FIG. 4b). The material can be fully dehydrogenated at T=250° C. in about 1200 sec, if the catalyst $Cr_2O_3$ is added (FIG. 4d). Pure $MgH_2$ cannot be dehydrogenated at T=250° C. within a reasonable period.

With reference to FIGS. 5 to 12, it is apparent that the acceleration obtainable in accordance with the invention for storing the hydrogen and for the release from the storage material of the electrode (anode) of the accumulator as well as the manufacturing method according to the invention substantially increases the power density and the current density of the accumulator by use of the electrode material, which has been catalyzed in accordance with the invention in comparison with conventional accumulators. As a result, the accumulators according to the invention are suitable for high power applications, for which, so far, only Ni-Cad elements or cells could be used (see also the above requirement criterium 6. Furthermore, storage materials can be used for the electrode whose equilibrium pressure is lower at the application conditions and which form more stable hydrides than those that have been common so far. As a result, lower self-discharge rates are achieved, see the above requirement criterium 6. The acceleration of the kinetics achieved by the catalysts according to the invention compensates for the loss in thermodynamic drive force toward a hydrogenation/dehydrogenation of the electrode material, so that, in spite of the greater stability of the hydride, current densities are achieved which are sufficient for the application. The oxide catalyst according to the invention or, respectively, the catalyst additions can be manufactured or provided at substantially lower costs than the metals used so far, see above requirement criterium 8. The activation procedure for the electrode material used so far is eliminated with the manufacture of the metalliferous electrode material according to the invention (see criterium 5).

It is apparent from FIGS. 5 to 12 that the charging and discharging behavior of the electrode material according to the invention provides for extraordinarily large advantages and improvements when compared with the corresponding behavior of the conventional electrode materials.

It is basically possible to use the electrode material according to the invention also for electrodes of non-rechargeable primary elements or cells, which however could be regenerated.

What is claimed is:

1. A metalliferous storage material for hydrogen including a metal oxide as catalyst for the hydrogenation or dehydrogenation of the metalliferous storage material, said metal oxide of said catalyst including as the metal at least one of the group consisting of Sc, Ti, V, Cr, Mn, Fe, Co, Ni, Cu, Y, Nb, and Mo, the amount of the metal oxide in the storage material being 1 to 10 wt %.

2. A metalliferous storage material according to claim 1, wherein said metal oxide is a mixed oxide.

3. A metalliferous storage material according to claim 1, wherein said metal has a nanocrystalline structure.

4. A metalliferous storage material according to claim 1, wherein said catalyst has a nanocrystalline structure.

5. A method of producing a metalliferous storage material for hydrogen including a metal oxide consisting of at least one of Sc, Ti, V, Cr, Mn, Fe, Co, Ni, Cu, Y, Nb, and Mo, as a catalyst for the hydrogenation or dehydrogenation of the metalliferous storage material, said method comprising the step of subjecting the metalliferous material and said catalyst to a mechanical grinding process.

6. A method according to claim 5, wherein said grinding process is performed for a predetermined time.

7. A method according to claim 5, wherein said metalliferous material is first subjected to said grinding process and said catalyst is subsequently added to said grinding process.

8. A method according to claim 5, wherein said catalyst is first subjected to said grinding process and said metalliferous material is subsequently added to said grinding process.

9. A method according to claim 5, wherein said grinding process is performed in a protective inert gas atmosphere.

10. A method according to claim 9, wherein said inert gas is argon.

11. A method according to claim 9, wherein the duration of said mechanical grinding process is 1 to 200 hours.

12. A method of manufacturing an electrode of at least for use as a secondary element, said electrode having a surface of Sc, Ti, V, Cr, Mn, Fe, Co, Ni, Cu, Y, Nb, and Mo, said method comprising the step of exposing said surface to oxygen to form with the elements of said electrode material, in situ, a metal oxide at least on the surface of said electrode thereby providing for a catalyst facilitating the hydrogenation and dehydrogenation of said electrode material.

13. A method according to claim 12, wherein the surface of said electrode material is chemically activated before being exposed to said oxygen for forming said oxide.

14. A method according to claim 12, wherein the surface of said electrode material is mechanically activated before it is exposed to said oxygen to form the oxide.

* * * * *